US008336815B2

(12) United States Patent
Rauber et al.

(10) Patent No.: US 8,336,815 B2
(45) Date of Patent: Dec. 25, 2012

(54) CONSTANT-VELOCITY DRIVE SYSTEM FOR GIMBALED ROTOR HUBS

(75) Inventors: Richard Rauber, Arlington, TX (US); Frank B. Stamps, Colleyville, TX (US); James Lee Braswell, Jr., Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 875 days.

(21) Appl. No.: 12/301,191

(22) PCT Filed: May 19, 2006

(86) PCT No.: PCT/US2006/019388
§ 371 (c)(1),
(2), (4) Date: Nov. 17, 2008

(87) PCT Pub. No.: WO2008/045011
PCT Pub. Date: Apr. 17, 2008

(65) Prior Publication Data
US 2009/0184209 A1    Jul. 23, 2009

(51) Int. Cl.
*B64D 35/00* (2006.01)
*B64C 27/52* (2006.01)
(52) U.S. Cl. ........ 244/60; 244/7 R; 244/12.4; 244/17.25
(58) Field of Classification Search .................. 244/7 A, 244/17.11, 17.23, 23 B, 39, 60, 7 R, 7 C, 244/12.4, 17.25
See application file for complete search history.

(56) References Cited

U.S. PATENT DOCUMENTS

| | | | |
|---|---|---|---|
| 4,459,122 A | 7/1984 | Rehfeld | |
| 4,473,199 A | 9/1984 | Magill | |
| 4,729,753 A | 3/1988 | Neathery et al. | |
| 6,296,444 B1 | 10/2001 | Schellhase et al. | |
| 6,367,736 B1 | 4/2002 | Pancotti | |
| 6,695,254 B2 | 2/2004 | Zoppitelli et al. | |
| 6,712,313 B2 | 3/2004 | Zoppitelli et al. | |

OTHER PUBLICATIONS

Chinese First Office Action in Chinese counterpart application No. 200680054652.7, issued by Chinese Patent Office, Oct. 11, 2010.
International Search Report and Written Opinion in PCT/US06/19388, mailed Jul. 28, 2008.
International Preliminary Report on Patentability in PCT/US06/19388, mailed Jun. 3, 2009.
Mexican Examination Report dated May 30, 2012 from counterpart MX Application No. MX/a/2008/014774.
Canadian Examination Report in Canadian counterpart application No. 2,652,777, issued by Canadian Intellectual Property Office, Aug. 25, 2011, 3 pages.
Japanese First Office Action in Japanese counterpart application No. 2009-510934, issued by Japanese Patent Office, Jun. 21, 2011.

*Primary Examiner* — Joseph W Sanderson
(74) *Attorney, Agent, or Firm* — James E. Walton; Richard G. Eldredge

(57) ABSTRACT

A constant-velocity drive system for a rotary-wing aircraft rotor comprising a differential torque-splitting mechanism and a gimbal mechanism is disclosed. A rotary-wing aircraft having a rotary-wing aircraft rotor comprising a differential torque-splitting mechanism and a gimbal mechanism is disclosed.

12 Claims, 9 Drawing Sheets

CONSTANT-VELOCITY DRIVE SYSTEM FOR GIMBALED ROTOR HUBS

TECHNICAL FIELD

The present invention relates to the field of rotary-wing aircraft having gimbaled rotor hubs.

DESCRIPTION OF THE PRIOR ART

Consumer demand is increasing for rotary-wing aircraft to provide more thrust, higher speeds, and carry heavier loads and/or heavier fuselages. For example, there is a demand for more powerful tilt-rotor aircraft. Of course, where performance criteria such as those listed above are to be increased, the functional systems of the rotary-wing aircraft must be improved to provide the desired resultant performance enhancements. The rotor hub drive system is one of the many functional systems which requires improvement in order to meet the demand for improved rotary-wing aircraft performance.

Rotor hub drive systems often are/include constant-velocity drive systems, or homokinetic drive systems, which have been in use for a very long time. There are numerous successful designs of constant-velocity drive systems for various types of rotary-wing aircraft. Constant-velocity drive systems are typically designed for transferring torque, or rotational force, from a first rotating member to a second rotating member, where the first rotating member may not be coaxial with the second rotating member. Constant-velocity drive systems are particularly well suited for use in rotary-wing aircraft as a means of transferring torque from a rotating mast to a rotor hub, especially where the rotor hub is gimbaled to the rotating mast. Two such constant-velocity drive systems are taught by Zoppitelli et al. in U.S. Pat. No. 6,712,313.

Zoppitelli et al. teach a first constant-velocity drive system where a torque-splitting mechanism (see Zoppitelli et al. FIGS. 2-6) is associated with a two-gimbal device (see Zoppitelli et al. FIGS. 7 and 8) for driving in rotation and tilting (with respect to a mast) a rotor hub. Zoppitelli et al. also teach a second constant-velocity drive system where the same torque-splitting mechanism drives a rotor hub in rotation via drive links and where the rotor hub is gimbaled to the mast by a gimbal means comprising half of a flapping thrust bearing (see Zoppitelli et al. FIGS. 9 and 10). In the second constant-velocity drive system, the differential mechanism drives the hub in rotation via drive links while the hub is connected to the mast with a tilting means comprising a flapping thrust bearing.

Referring now to FIG. 1, a tilt-rotor, rotary-wing aircraft incorporating a constant-velocity drive system as taught by Zoppitelli et al. is illustrated. Tilt-rotor aircraft 17 is shown in an airplane mode of flight operation. When aircraft 17 is in an airplane mode, wings 19 (only one shown) are utilized to lift fuselage 21 in response to the action of rotor systems 23 (only one shown). Rotor-blades of rotor systems 23 are not shown. Two nacelles 25 (only one shown) each substantially enclose a constant-velocity drive system 27, obscuring constant-velocity drive system 27 from view in FIG. 1. Of course, each rotor system 21 is driven by associated engines (not shown), one engine housed within each nacelle 25.

Referring now to FIGS. 2-6, Zoppitelli et al. teach a differential torque-splitting mechanism fitted to a rotor mast, for driving in rotation the hub of a convertible aircraft tilting rotor, as described above with reference to FIG. 1.

In FIGS. 2-6, mast 29 of the rotor, driven by its base (not shown) in rotation about its longitudinal axis Z-Z, supports, a differential mechanism, designated as a whole by number 31. This mechanism 31, which belongs to the means for constant-velocity drive of the rotor hub, mainly comprises an assembly of three discs coaxial about the axis Z-Z and placed one on top of the other along this axis, a central disc 33 of which is arranged axially between the other two discs 35 and 37, one of which, arranged axially between central disc 33 and a seating shoulder 39, annular, peripheral and projecting radially toward the outside on shaft or mast 29, is termed an inner disc 35, as it is arranged along the axis Z-Z at the base end of mast 29, and therefore toward the inside of the convertible aircraft structure, while third disc 37, termed the outer disc, is arranged axially between central disc 33 and an axial preload device 41, fitted along a threaded portion of mast 29, to provide axial stacking (along Z-Z) of the three discs 33, 35 and 37 of the assembly with preloading, under the conditions and for the reasons which are explained below.

Central disc 33 is made integral in rotation with mast 29 by internal axial splines 43 in its central bore, which are engaged with external axial splines on a cylindrical splined portion 29a of mast 29, to transmit the torque. As can also be seen in FIG. 7, central disc 33 has a central portion 45, between two cylindrical journals 47 and 49 at the axial ends, which is extended radially toward the outside by four spider arms 51 each drilled with two cylindrical bores 55 side by side and with parallel axes. The four spider arms 51 are diametrically opposite in twos, and regularly distributed over the periphery of central portion 45 of central disc 33.

Each of the inner 35 and outer 37 discs comprises a peripheral portion respectively 57 and 59, which is offset axially toward central portion 45 of central disc 33 and surrounds inner axial journal 47 (the lower one in the drawings) or respectively outer axial journal 49 (the upper one in the drawings) of the latter, and each of the peripheral portions 57 and 59 respectively of inner disc 35 and of outer disc 37 also has, projecting radially toward the outside, four spider arms respectively 61 and 63, also diametrically opposite in twos and regularly distributed over the periphery of said peripheral portions 57 and 59, and each also drilled with two bores respectively 65 and 67 side by side and with parallel axes, and of the generally the same diameter as bores 55 in central disc 33.

Moreover, inner disc 35 supports two drive pins 69, of generally cylindrical shape with a circular cross-section, with axes contained within a radial (relative to the axis Z-Z) plane, and which project toward the outside of the inner disc and occupy diametrically opposite positions, each being between two spider arms 61 of disc 35, and at the same time offset axially toward central portion 45 of central disc 33, so that they can be housed in one of the cut-away portions, delimited at the periphery of this central portion 45 of central disc 33, between two spider arms 51 of disc 33, (see FIGS. 5 and 6). Similarly, outer disc 37 has two drive pins 71, of the same cylindrical form with a circular cross-section and of the same size as pins 69 and also diametrically opposite and projecting toward the outside of peripheral portion 59 of disc 37, while being at the same time offset axially toward central portion 45 of central disc 33, so that they can each be housed in one of the four cut-away portions delimited by spider arms 51 on the periphery of central disc 33 and alternating in a circumferential direction about the axis common to these three discs 33, 35 and 37, with drive pins 69 of inner disc 35.

The three discs 33, 35 and 37 are placed one on top of the other axially so that at rest spider arms 51, 61 and 63 are directly above each other, and bores 55, 65 and 67 aligned between one disc and another, as shown in the left-hand half-view in FIG. 4, so that, in each of the eight groups of three bores 55, 65 and 67 aligned in this way, there can be housed one respectively of eight connecting pins 73, distributed in this way, over the periphery of the three discs, in four assemblies of two adjacent connecting pins 73, radially at the same distance from the axis Z-Z of mast 29, and distributed regularly in four pairs of connecting pins 73, diametrically opposite in twos and along two diametral planes perpendicular to each other, as shown in FIG. 2.

Each connecting pin 73 has its longitudinal geometrical axis A-A substantially parallel to the axis Z-Z of mast 29, and is hinged in each of the three corresponding spider arms 51, 61 and 63 by one respectively of three ball joint connections 75, 77 and 79 which are centered on the axis A-A. As shown in the right-hand half-view in FIG. 4, each connecting pin 73 is a pin with triple ball joints, with a central ball joint 81 with a larger diameter than that of two end ball joints 83, of the same diameter, each of ball joints 81 and 83 being a laminated ball joint retained radially (relative to the axis A-A) inside a cylindrical laminated bearing 85 (for the central ball joint connection 75) and 87 (for each of the end ball joint connections 77 and 79), cylindrical laminated bearings 85 and 87 being substantially coaxial about the geometrical axis A-A of corresponding connecting pin 73. For this reason, each connecting pin 73 is in the form, viewed from the outside, of a cylindrical sleeve divided axially into three parts placed one on top of the other and slightly spaced apart from each other, with a radial collar at the upper end (see FIG. 7) and each enclosing three ball joint connections 75, 77 and 79 offset along the axis A-A.

After the eight connecting pins 73 are installed, central disc 33, integral in rotation with mast 29, is a driving disc for inner disc 35 and outer disc 37, which are driven discs of mechanism 31, and each of which can drive in rotation, about the axis Z-Z, and by its two corresponding drive pins 69 or 71, at least one of driving devices connected to the hub to cause the latter to rotate, which are each hinged to the hub, so as to drive the latter in rotation, from the rotation of mast 29.

For the reasons explained below, in order to allow relative rotation, about the axis Z-Z of rotation of mast 29, between each of driven discs 35 and 37, on the one hand, and on the other, driving disc 33 and mast 29, each of driven discs 35 and 37 is mounted, in its portion which surrounds mast 29, axially between two radial annular bearings 89, surrounding mast 29 and substantially coaxial about the axis Z-Z of the latter. Thus the central portion of driven discs 35 is fitted between an inner radial bearing 89, seated against shoulder 39 of mast 29, and an outer radial bearing 89 seated against the inner axial end of journal 47 of driving disc 33, while the central portion of the other driven disc 37 is fitted between a radial bearing 89, seated against the outer end face of journal 49 of driving disc 33, and another radial bearing 89 with loads applied axially, in the direction which applies axial preloading to the stack of three discs 33, 35 and 37 and of four bearings 89, by axial preload device 41 which, in these drawings, is shown schematically as consisting of a nut 91 screwed around the externally threaded portion 29b of mast 29.

In addition to radial annular bearings 89, which may be plain but are preferably each a cylindrical laminated bearing, as shown, or possibly truncated cone-shaped, comprising at least one vulcanized elastomer washer between two metal washers, two axial bushings 93 are provided to facilitate relative rotation between each of driven discs 35 and 37, on the one hand, and on the other mast 29 and driving disc 33. One of two bushings 93 is fitted between peripheral portion 57 of driven disc 35 and journal 47 of driving disc 33, while the other axial bushing 93 is fitted between peripheral portion 59 of other driven disc 37 and other journal 49 of driving disc 33. These two axial bushings 93 are also substantially coaxial about the axis Z-Z of mast 29.

In FIGS. 2-6, differential mechanism 31 is such that two drive pins 69 of driven disc 35 are not only diametrically opposite relative to the axis Z-Z, but project radially toward the outside of driven disc 35, perpendicularly to the axis Z-Z, and coaxial about a first diametral axis X-X of mechanism 31 and of mast 29, so that pins 69 constitute a first diametral drive arm integral with driven disc 35. Similarly, the two drive pins 71 of driven disc 37, also diametrically opposite relative to the axis Z-Z and perpendicular to the latter, overhanging and projecting radially toward the outside of driven disc 37, and coaxial about a second diametral axis Y-Y of mechanism 31 and which at rest is perpendicular to the first diametral axis X-X and converging with the latter on the axis Z-Z, constitute a second diametral drive arm, integral in rotation with driven disc 37 and, when mechanism 31 is at rest, perpendicular to the first diametral drive arm formed by pins 69.

This differential mechanism 31 is compatible with a double-gimbal device 96, as shown in FIGS. 7 and 8, for a rotor in which this double-gimbal device 96 constitutes both the driving means and the tilting means placed between differential mechanism 31 on the one hand and, on the other, a rotor hub supporting blades, and which is thus mounted so as to pivot about any flapping axis intersecting the axis Z-Z of mast 29 and extending in any direction about this axis Z-Z, so that the hub, and therefore the rotor, can be driven in rotation about a geometrical axis inclined in any direction about the axis Z-Z of mast 29.

Referring now to FIGS. 7 and 8, double-gimbal device 96 comprises a first gimbal 97, substantially in the shape of an octagon (viewed in plan) mounted so as to pivot relative to mast 29 by two first bearings 101a, 101b which may be plain cylindrical bearings or, preferably, bearings consisting of cylindrical, conical, and/or where appropriate spherical laminated elements. A second gimbal 99, also substantially octagonal in shape, and arranged above first gimbal 97, is mounted so as to pivot in a similar manner by two second bearings such as 103a (the other one is not visible), of the same type as bearings 101a and 101b so that second gimbal 99 can pivot relative to mast 29.

The two gimbals 97 and 99 are thus each driven in rotation by one respectively of driven discs 35 and 37, themselves driven by mast 29 and driving disc 33, about the axis Z-Z of mast 29, while being mounted so as to pivot each about one respectively of the two axes, normally perpendicular, X-X and Y-Y.

In addition, the first gimbal 97 is hinged to a casing or hub body by two first ball joint connections such as 107a (see FIG. 8), preferably comprising laminated ball joints, each combined with a cylindrical or conical laminated bearing, and which are diametrically opposite relative to the axis Z-Z of mast 29, and each centered on the second diametral axis Y-Y, being retained in two small sleeves 105 coaxially about the axis Y-Y on gimbal 97, in the neutral or rest position of the rotor, the two first ball joint connections such as 107a remaining centered substantially in a diametral plane, defined by the axis Z-Z and by the second diametral axis Y-Y, when first gimbal 97 is pivoted about the first diametral axis X-X.

In a similar manner, second gimbal 99 is hinged to a hub body by two second ball joint connections 109a and 109b, also preferably comprising laminated ball joints combined with cylindrical or conical laminated bearings and, diametrically opposite relative to the axis Z-Z and each centered, at rest or in the neutral position of the rotor, on the first diametral axis X-X, while being retained in small sleeves 111 coaxial about the axis X-X on gimbal 99, these second ball joint connections 109a and 109b remaining substantially centered in a diametral plane defined by the axis Z-Z and the first diametral axis X-X when second gimbal 99 is pivoted about the second diametral axis Y-Y.

In this embodiment, a rotor hub is connected to mast 29 by two crossing gimbals 97 and 99, hinged to the inside of the hub by ball joint connections, preferably laminated such as 107a and 109a, 109b, and hinged so as to pivot about the two perpendicular diametral drive arms 69-69 and 71-71, at rest, by bearings 101a, 101b and such as 103a, according to an arrangement at the same time constituting a mechanism for tilting the hub and the blades, allowing pivoting of the hub as a whole about any flapping axis intersecting the axis Z-Z of mast 29 and running in any direction about the axis Z-Z, and a mechanism giving constant velocity drive of the hub and of the blades about a geometrical axis of rotation of the hub, which may be inclined in any direction about the axis Z-Z of mast 29 by causing gimbals 97 and 99 to pivot about their respective diametral axes X-X and Y-Y. The torque is transmitted between mast 29 and the hub by two transmission trains each comprising mast 29, the central disc 33, one respectively of the driven discs 35 and 37, and therefore gimbal 97 or 99 pivoting on driven disc 35 or 37, the corresponding two bearings 101a, 101b or such as 103b, the corresponding two ball joint connections such as 107a or 109a, 109b and the hub.

With a pivoting device of this type with two gimbals 97 and 99, it is known that tilting of the rotor disc and therefore of the hub relative to the axis Z-Z of mast 29 induces a cyclic relative rotation of these two gimbals 97 and 99, at a frequency of 2Ω (where Ω is the frequency of rotation of the rotor), the two gimbals 97 and 99 performing rotation movements in opposite directions and of equal amplitude about the drive axis and in a plane perpendicular to this drive axis. The differential mechanism 31 compensates kinematically for this cyclic relative rotation of the two gimbals 97 and 99, by means of the connecting pins 73, linking driven discs 35 and 37 to driving disc 33, and which are inclined slightly while accompanying the rotation of driven discs 35 and 37 in opposite directions about the axis Z-Z of mast 29. At the same time, the static torque transmitted by mast 29 to two gimbals 97 and 99 is split by driving disc 33 between two driven discs 35 and 37, by means of connecting pins 73. This capability of the differential mechanism 31 to allow any relative movement of two gimbals 97 and 99 in the plane perpendicular to the drive axis eliminates the hyperstatic characteristics of a device in which the tilt mechanism with two gimbals would be directly connected to mast 29.

The constant velocity characteristics are thus obtained by the kinematic compatibility between the tilting and drive means using two gimbals 97 and 99, by means of differential mechanism 31.

Transmission of the loads from the rotor (lift and coplanar loads) to mast 29 is provided, from the hub to mast 29, via two gimbals 97 and 99 which, in opposite directions, transmit the torque from mast 29 to the hub. The radial annular bearings 89 and axial bushings 93, allowing relative rotation between driven discs 35 and 37 (connected to gimbals 97, 99) and driving disc 33 connected to mast 29, assist in transmitting the lift load and the coplanar loads, the lift also being transferred through the presence of axial preload device 41 with elastic deformation of the stack of three discs 33, 35 and 37 and of four annular radial bearings 89 against shoulder 39 on mast 29.

While the constant-velocity drive systems taught by Zoppitelli et al. may be suitable for smaller, lighter, less powerful rotary-wing aircraft, significant limitations become apparent when the constant-velocity drive systems taught by Zoppitelli et al. are considered for use in larger, heavier, more powerful rotary-wing aircraft. For example, in order to increase the torque transfer capability of a constant-velocity drive system taught by Zoppitelli et al., the overall size of the torque-splitting mechanism would necessarily increase. Additionally, since the two-gimbal device associated with the torque-splitting mechanism substantially envelopes the torque-splitting mechanism, the overall size of the two-gimbal device would also necessarily increase. It is desirable to configure the rotating components of rotor systems to remain as close to the axis of rotation of the mast as possible to minimize undesirable resultant forces. Clearly, increasing the size of the torque-splitting mechanism and the two-gimbal device taught by Zoppitelli et al. is not desirable and does not provide a satisfactory solution for providing a constant-velocity drive system for a larger, heavier, more powerful rotary-wing aircraft.

While the above described rotor hub advancements represent significant developments in rotor hub design, considerable shortcomings remain.

SUMMARY OF THE INVENTION

There is a need for an improved constant-velocity drive system which allows transfer of increased torque while minimizing negative dynamic effects and meeting component sizing/packaging requirements.

Therefore, it is an object of the present invention to provide an improved constant-velocity drive system which allows transfer of increased torque while minimizing negative dynamic effects and meeting component sizing/packaging requirements.

This object is achieved by providing a constant-velocity drive system comprising a torque-splitting mechanism which is substantially displaced along an axis of rotation from an associated gimbal mechanism and/or a plurality of drive links. The constant-velocity drive system may be configured such that: (1) a torque-splitting mechanism transfers force to a gimbal mechanism (located further away from the rotary-wing craft fuselage than the torque-splitting mechanism) and the gimbal mechanism transfers force to a rotor hub; or (2) a torque-splitting mechanism transfers force to a gimbal mechanism (located closer to the rotary-wing craft fuselage than the torque-splitting mechanism) and the gimbal mechanism transfers force to a rotor hub.

The present invention provides significant advantages, including: (1) providing an improved constant-velocity drive system with reduced negative dynamic effects for rotary-wing aircraft, (2) allowing transfer of more torque through a differential torque-splitting mechanism, and (3) providing a robust structural means for connecting a differential torque-splitting mechanism and a double-gimbal mechanism where the differential torque-splitting mechanism is axially spaced from the double-gimbal mechanism.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention is an improved constant-velocity drive system for a rotary-wing aircraft which provides improved torque transfer while minimizing negative dynamic characteristics. While specific reference is made to using the present invention with tilt-rotor rotary-wing aircraft, the present invention may alternatively be used with any other rotary-wing vehicle/craft.

Figure 9:
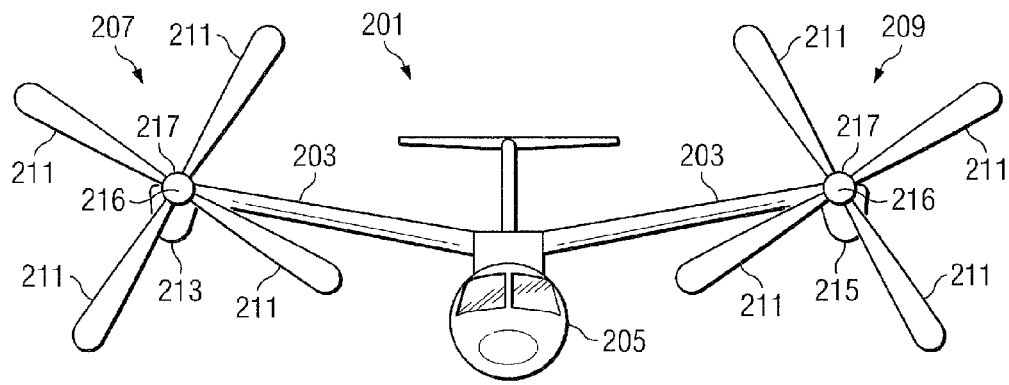
FIG. 9 is front view of a tilt-rotor rotary-wing aircraft having an constant-velocity drive system according to the present invention.

FIG. 9 depicts a tilt-rotor, rotary-wing aircraft incorporating the constant-velocity drive system of the present invention. FIG. 9 illustrates a tilt-rotor aircraft 201 in an airplane mode of flight operation. When in airplane mode, wings 203 are utilized to lift craft body 205 in response to the action of rotor systems 207, 209. Each rotor system 207, 209 is illustrated as having four rotor-blades 211. Each of nacelles 213, 215 (along with associated spinning covers 216) substantially enclose a constant-velocity drive systems 217, obscuring constant-velocity drive systems 217 from view in FIG. 9. Of course, each rotor system 207, 209 is driven by an engine (not shown), each substantially housed within one of nacelles 213, 215.

Figure 10:
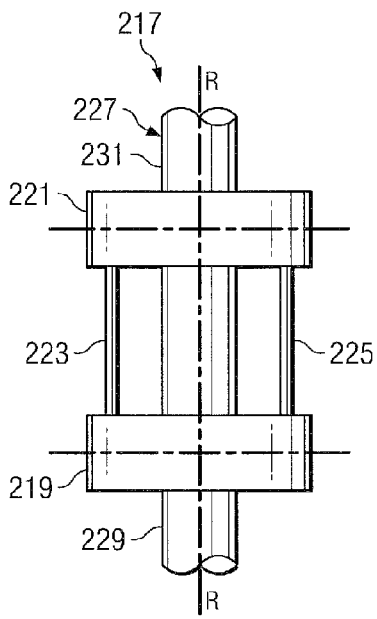
FIG. 10 is a schematic view of a constant-velocity drive system according to the present invention.

Referring now to FIG. 10 in the drawings, a simplified schematic view of a constant-velocity drive system 217 according to the present invention is illustrated. Constant-velocity drive system 217 is adapted to operate in a manner substantially similar to the constant-velocity drive system of Zoppitelli et al. Constant-velocity drive system 217 generally comprises a differential torque-splitting mechanism 219, a gimbal mechanism 221, and at least two linking means 223, 225. Differential torque-splitting mechanism 219 and gimbal mechanism 221 are associated with a rotor mast 227, which is configured for rotation about a central axis R-R of rotation of mast 227. Mast 227 comprises an inboard portion 229 and an outboard portion 231. As assembled for operation, and therefore being associated with an engine and/or a transmission linkage between the engine and mast 227, inboard portion 229 is located nearer the engine and/or a transmission linkage than is outboard portion 231. Differential torque-splitting mechanism 219 is located nearer inboard portion 229 than is gimbal mechanism 221 while gimbal mechanism 221 is located nearer outboard portion 231 than is differential torque-splitting mechanism 219.

Generally, differential mechanism 219 serves substantially the same function as differential torque-splitting mechanism 31 as taught by Zoppitelli et al. and gimbal mechanism 221 serves substantially the same function as double-gimbal device 96 also taught by Zoppitelli et al. Since differential mechanism 219 and gimbal mechanism 221 are substantially displaced from each other along mast 227, linking means 223, 225 are used to connect differential mechanism 219 and gimbal mechanism 221. Linking means 223, 225 are adapted to complement and interface with differential torque-splitting mechanism 219 and gimbal mechanism 221 in a manner such that each linking means 223, 225 is a portion of at least two independent force transfer paths, allowing differential mechanism 219 to kinematically compensate for the cyclic relative rotation experienced by gimbal mechanism 221 while linking means 223, 225 share in transferring the static torque from differential mechanism 219 to gimbal mechanism 221. This capability of differential mechanism 219 to allow any relative movement of at least two portions (not shown) of gimbal mechanism 221 in a plane perpendicular to axis R-R eliminates the hyperstatic characteristics of a device in which a tilt mechanism with two gimbals is directly connected to a mast. As further assembled for operation, gimbal mechanism 221 is attached to a rotor hub (not shown) for driving the rotor hub in rotation.

Figure 11:
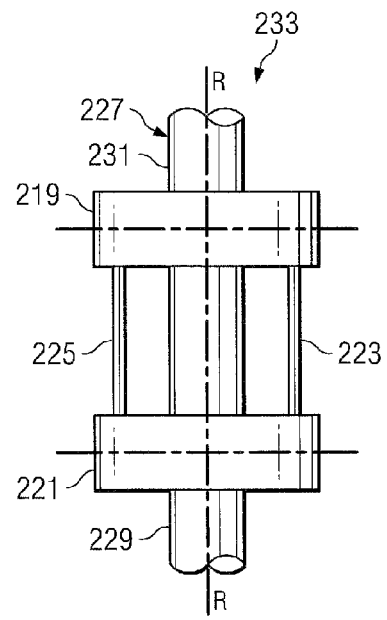
FIG. 11 is a schematic view of an alternate embodiment of a constant-velocity drive system according to the present invention.
Figure 12:
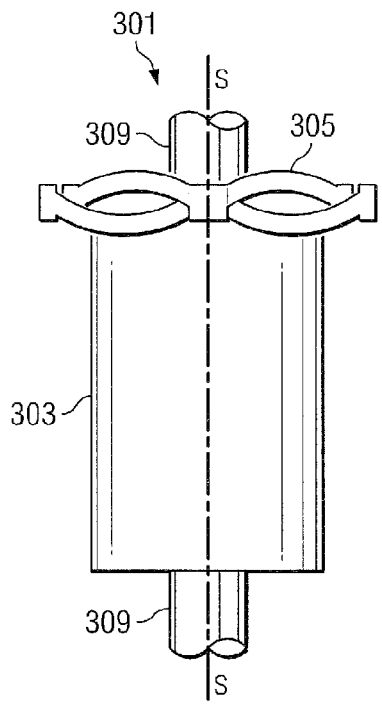
FIG. 12 is a side view of the preferred embodiment of a constant-velocity drive system according to the present invention.
Figure 13:
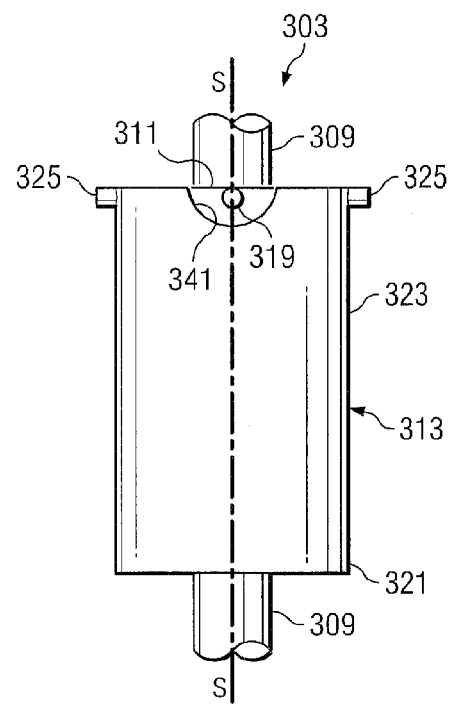
FIG. 13 is a side view of the differential torque-splitting mechanism of the constant-velocity drive system of FIG. 12.

Referring now to FIG. 11 in the drawings, a simplified schematic view of a constant-velocity drive system 233 according to the present invention is illustrated. Constant-velocity drive system 233 is substantially similar to constant-velocity drive system 217 in function. However, constant-velocity drive system 233 differs from constant-velocity drive system 217 in that differential torque-splitting mechanism 219 is located nearer outboard portion 231 than is gimbal mechanism 221 while gimbal mechanism 221 is located nearer inboard portion 229 than is differential torque-splitting mechanism 219.

While constant-velocity drive systems 217, 233 differ, each represent an improvement upon constant-velocity drive system 27 of Zoppitelli et al. insofar as each constant-velocity drive system 217, 233 provides a desirable constant-velocity drive system capable of transferring increased torque loads without radially expanding (about the axis of rotation of the mast) the physical size of the differential torque-splitting mechanism or the gimbal mechanism. This is accomplished generally by displacing (along the axis R-R of rotation of the mast) the differential torque-splitting mechanism from the gimbal mechanism. By displacing the differential torque mechanisms from the gimbal mechanism, the input of the constant-velocity drive system (torque transfer from the mast to the differential torque mechanism) is necessarily displaced (along the axis of rotation of the mast) from the output of the constant-velocity drive system (torque transfer from the gimbal mechanism to an associated rotor hub).

Referring now to FIGS. 12-17 in the drawings, a constant velocity drive system 301 according to the preferred embodiment of the present invention is illustrated. Constant-velocity drive system 301 comprises a differential torque-splitting mechanism 303 (shown in more detail in FIGS. 13 and 15-17) and a double-gimbal mechanism 305 (shown in FIGS. 12 and 14) which together function to provide the benefits also provided by constant-velocity drive system 217. Differential torque-splitting mechanism 303 comprises a central driving disk 307 adapted to be integral in rotation about an axis of rotation S-S with a mast 309. Differential torque-splitting mechanism also comprises an inner driven tube 311 and an outer driven tube 313. Inner driven tube 311 comprises a base portion 315, a riser portion 317, and drive arm portions 319. Similarly, outer driven tube 313 comprises a base portion 321, a riser portion 323, and a drive arm portion 325.

Figure 16:
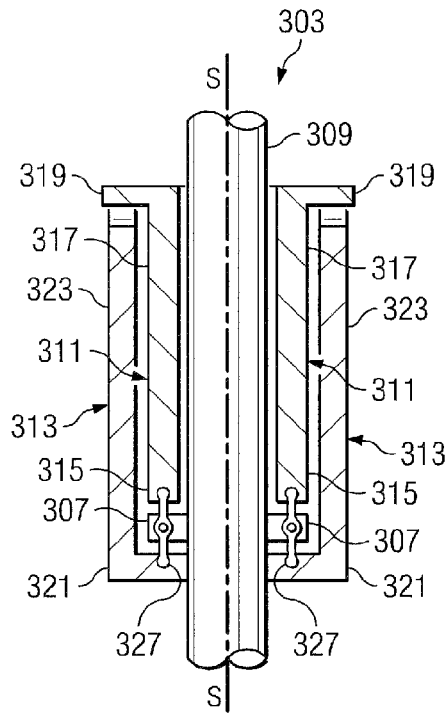
FIG. 16 is a simplified schematic cross-sectional view (taken at cutting line D-D of FIG. 15) of the differential torque-splitting mechanism of the constant-velocity drive system of FIG. 12.
Figure 17:
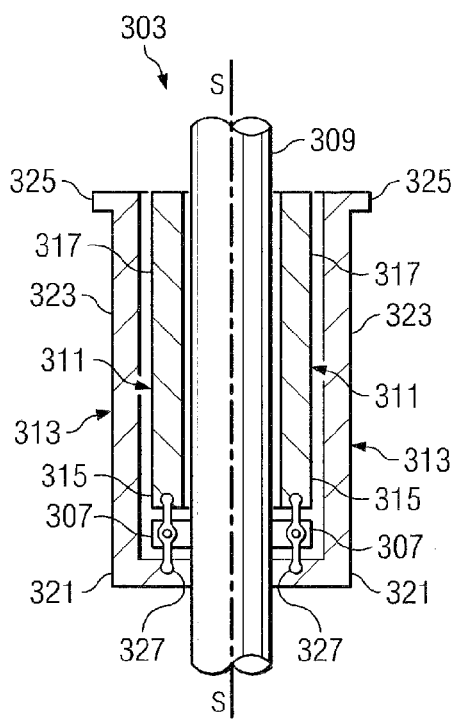
FIG. 17 is a simplified schematic cross-sectional view (taken at cutting line C-C of FIG. 15) of the differential torque-splitting mechanism of the constant-velocity drive system of FIG. 12.

Base portions 315 and 321 are substantially shaped as disks located generally normal to axis of rotation S-S. Inner driven tube 311 and outer driven tube 313 are concentrically located about axis of rotation S-S, with inner driven tube 311 being located between outer driven tube 313 and mast 309. As shown more clearly in FIGS. 15 and 16 (where FIG. 16 is a diagrammatic cross-sectional view taken at axis/cutting line D-D of FIG. 15 and where FIG. 17 is a diagrammatic cross-sectional view taken at axis/cutting line C-C of FIG. 15), base portions 315 and 321 cooperate with central driving disk 307, through the use of triple joint pins 327. Hence, triple joint pins 327 allow for relative rotation, about the axis of rotation S-S of mast 309, between each of inner driven tube 311 and outer driven tube 313. Triple joint pins 327 each comprise three ball joints, a central joint and two end joints (not labeled for clarity), where for each triple joint pin 327 a central joint is associated with central driving disk 307 and the two remaining end joints are associated with bases 315, 321. Inner base portion 315 is located above central driving disk 307 and outer base portion 321 is located below central driving disk 307 in this embodiment. Of course, other necessary bearings, axial preload devices, bushings, and/or interface components are integrated into differential torque-splitting mechanism 303 as necessary, and the integration of such is known to those ordinarily skilled in the art, and may be applied to the current embodiment in light of the present teachings.

Riser portions 317 and 323 are substantially shaped as tubes extending from base portions 315, 321, respectively, along axis of rotation S-S. Riser portions 317, 323 serve substantially the same function as linking means 223, 225 of FIGS. 10 and 11, and are configured for transferring torque from base portions 315, 321 to drive arm portions 319, 325, respectively. Riser portions 317, 323 are sized and shaped to be generally located as close to axis S-S as practicable while retaining any required space between mast 309 and riser portion 317 and between riser portion 317 and riser portion 323.

Drive arm portions 319 and 325 generally comprise cylindrical pin-like protrusions extending from riser portions 317, 323, respectively, and extending radially away from axis of rotation S-S. Drive arm portions 319, 325 generally serve as the interfaces between each of inner driven tube 311 and outer driven tube 313, respectively, and double-gimbal device 305. As shown most clearly in FIG. 15, drive arm portions 319 are located along an axis D-D while drive arm portions 325 are located along an axis C-C, generally perpendicular to each other, and both generally perpendicular to axis of rotation S-S.

Figure 1:
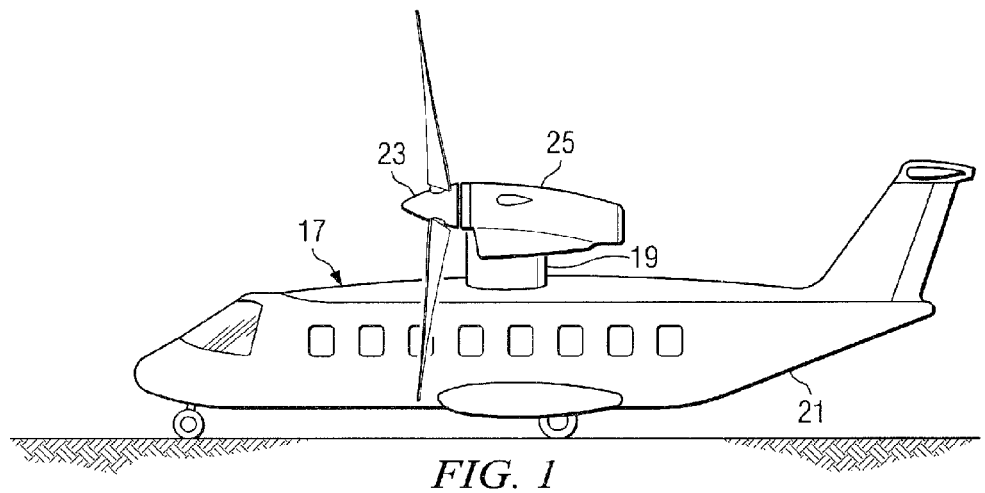
FIG. 1 is a side view of a prior art tilt-rotor aircraft having a constant-velocity drive system as taught by Zoppitelli et al.
Figure 2:
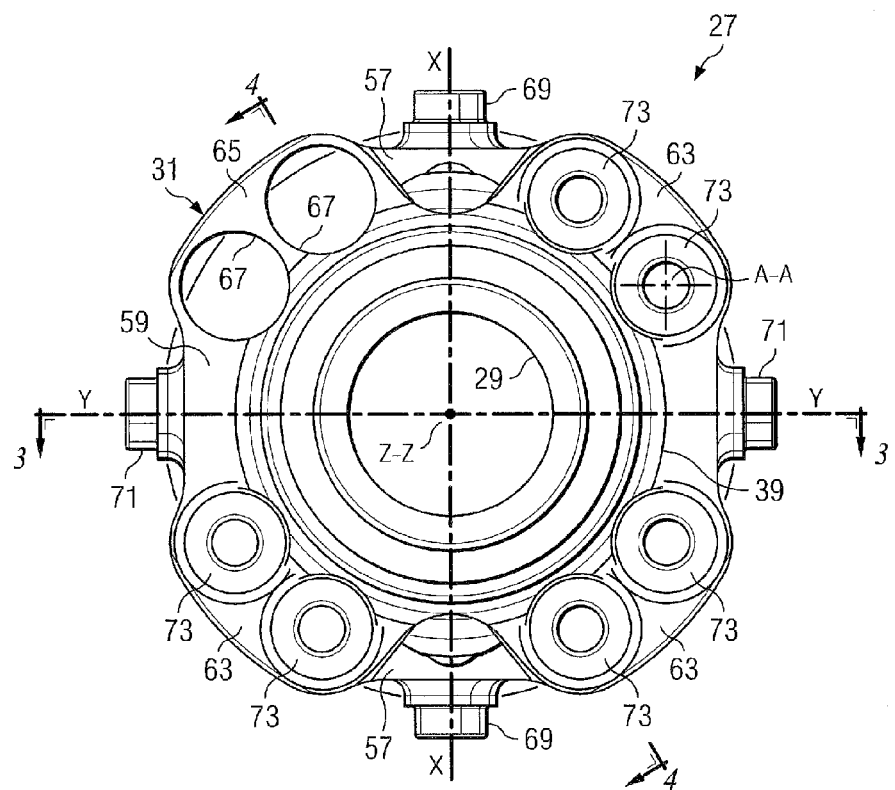
FIG. 2 is top view of a differential mechanism of the constant-velocity drive of FIG. 1.
Figure 3:
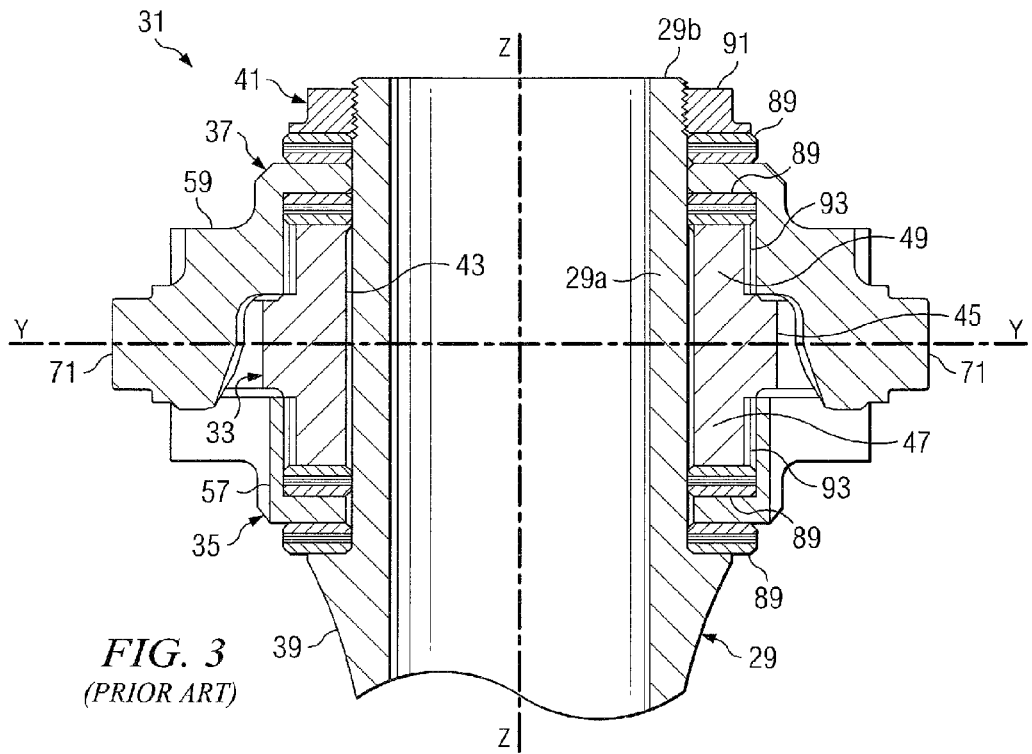
FIG. 3 is a cross-sectional view, taken at cutting line III of FIG. 2, of the differential mechanism of FIG. 2.
Figure 4:
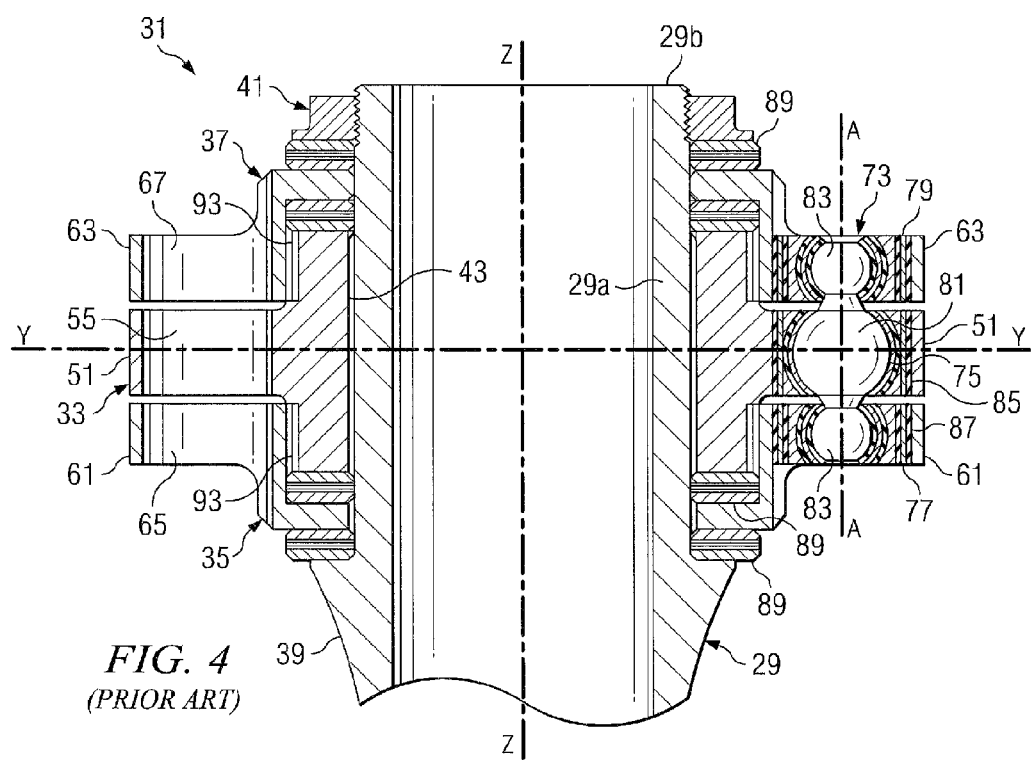
FIG. 4 is a cross-sectional view, taken generally near cutting line IV of FIG. 2, of the differential mechanism of FIG. 2.
Figure 5:
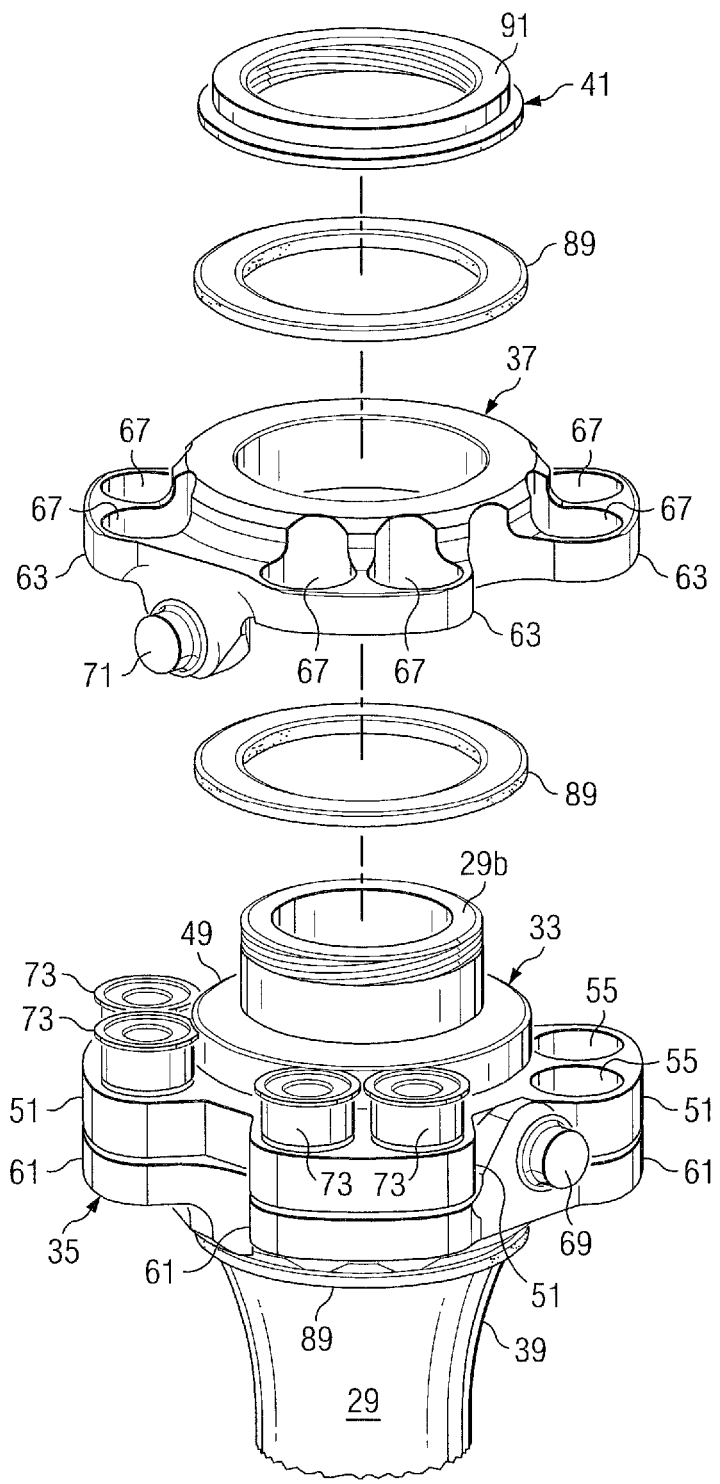
FIG. 5 is an exploded oblique view of the differential mechanism of FIG. 2.
Figure 6:
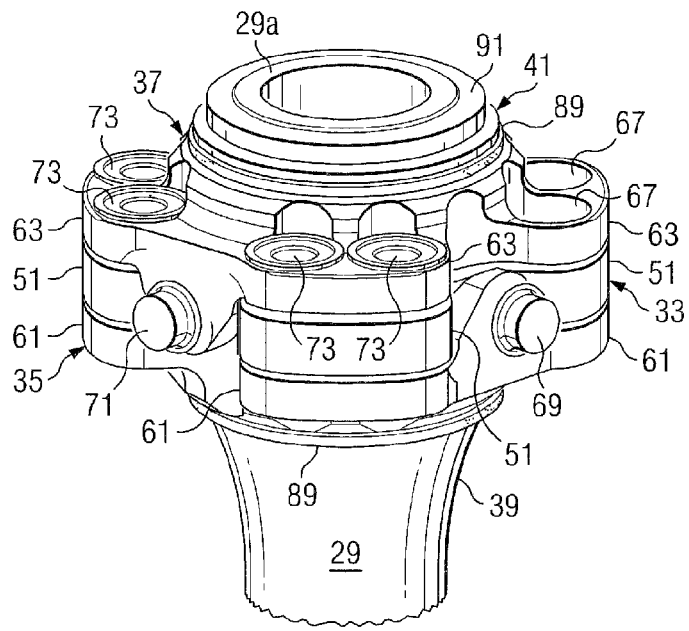
FIG. 6 is an oblique view of the differential mechanism of FIG. 2.
Figure 8:
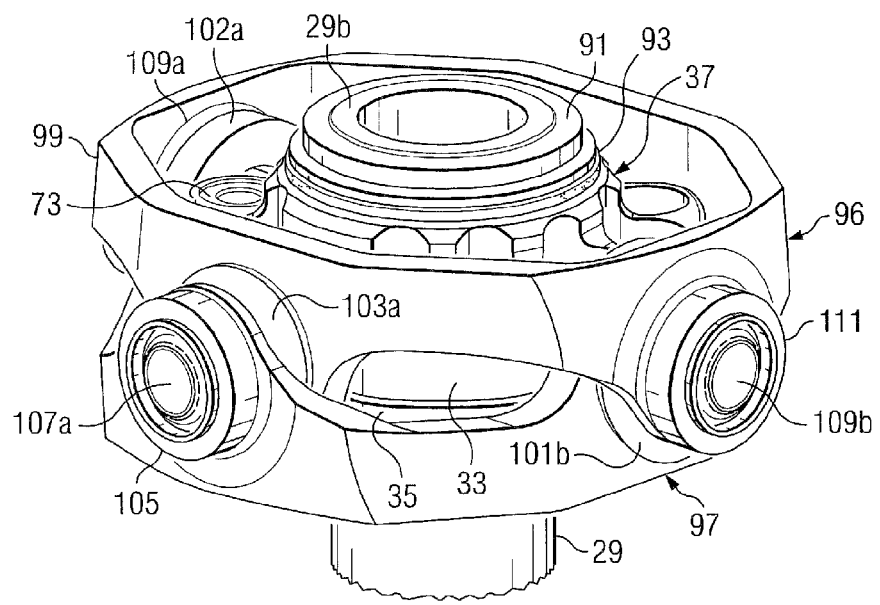
FIG. 8 is an oblique view of the differential mechanism and a double-gimbal device of the constant-velocity drive system of FIG. 1.
Figure 7:
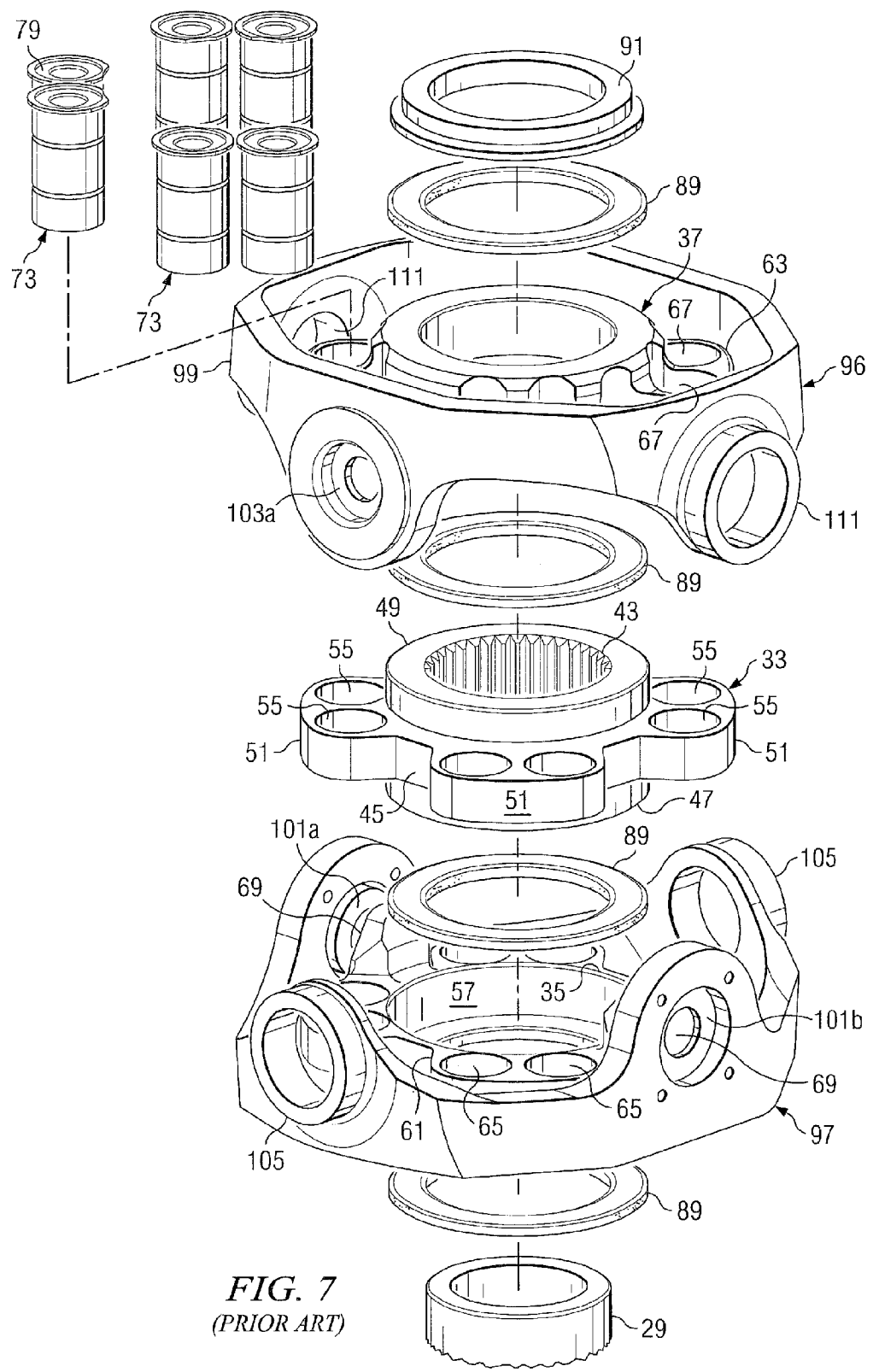
FIG. 7 is an exploded oblique view of the differential mechanism and a double-gimbal device of the constant-velocity drive system of FIG. 1.
Figure 14:
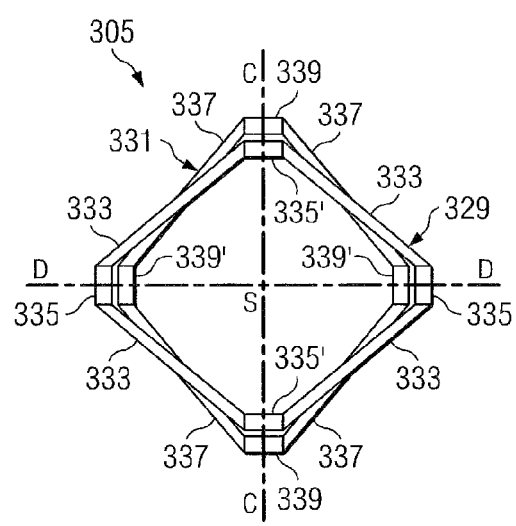
FIG. 14 is a top view of the double-gimbal mechanism of the constant-velocity drive system of FIG. 12.
Figure 15:
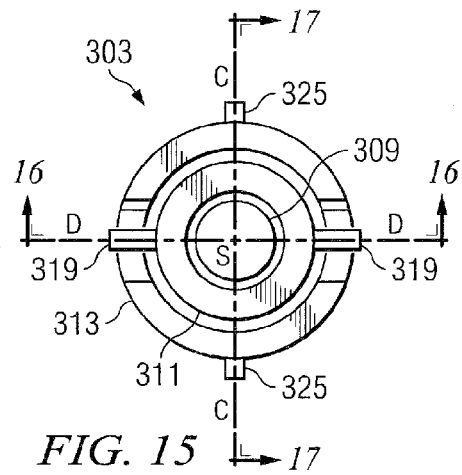
FIG. 15 is a top view of the differential torque-splitting mechanism of the constant-velocity drive system of FIG. 12.

As shown in FIG. 14, double-gimbal mechanism 305 comprises a first gimbal 329 and a second gimbal 331. First gimbal 329 comprises gimbal arms 333 and gimbal joints 335 while second gimbal 331 comprises gimbal arms 337 and gimbal joints 339. Double-gimbal device 305 is adapted for connection to the inside of a rotor hub (not shown) through ball joints (not shown) incorporated into the four gimbal joints 335, 339 located most radially outward from axis S-S. In a manner substantially similar to double-gimbal device 96 of FIGS. 7 and 8, double-gimbal mechanism 305 constitutes a mechanism for tilting the rotor hub and attached blades, allowing pivoting of the hub as a whole about any flapping axis intersecting the axis S-S and running in any direction about axis S-S, and a mechanism giving constant velocity drive of the rotor hub and of the blades about an axis of rotation of the rotor hub, which may be inclined in any direction about the axis S-S by causing gimbals 329 and 331 to pivot about their respective axes D-D and C-C.

Drive arm portions 319 are adapted for flexible connection to and for driving second gimbal 331. Specifically, drive arm portions 319 are connected to gimbal joints 339' along axis D-D. Similarly, drive arm portions 325 are adapted for flexible connection to and for driving first gimbal 229. Specifically, drive arm portions 325 are connected to gimbal joints 335' located along axis C-C. As clearly shown in FIG. 13, since inner driven tube 311 is located concentrically within outer driven tube 313, appropriately sized cut-away portions 341 are present on riser portion 323 to allow passage of drive arm portions 319 for connection with double-gimbal mechanism 305.

Figure 18:
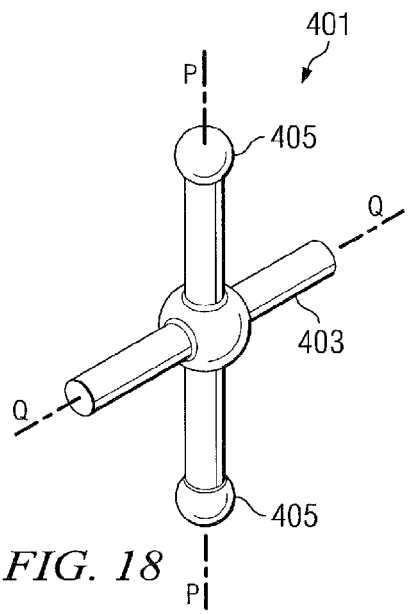
FIG. 18 is an oblique view of an alternative embodiment of a triple joint pin of an alternative embodiment of a differential torque-splitting mechanism according to the present invention.

Now referring to FIG. 18, an alternate embodiment of a portion of a triple joint pin according to the present invention is illustrated. While triple joint pins 327 are described as comprising three ball joint portions, it will be appreciated that the triple joint action of the drive pins may be retained even while replacing one of the three joints with a joint type other than a ball joint. Specifically, triple joint pin 401 comprises a central cylindrical joint portion 403 and two end ball joint portions 405. Cylindrical joint portion 403 is arranged coaxially with axis Q-Q. Ball joint portions 405 are arranged centered and displaced along axis P-P. Axes Q-Q and P-P are substantially perpendicular. Triple joint pin 401 is preferably oriented such that axis Q-Q extends generally radially from axis of rotation S-S. Triple joint pin 401 would provide similar interaction between a central drive disk, an inner driven tube, and an outer driven tube as triple joint pins 327, but would offer improved ability for triple joint pin 401 to translate along axis Q-Q and rotate about axis Q-Q. Of course the necessary additional and/or different bearing configurations for interfacing triple joint pin 401 with a central drive disk, an inner driven tube, and an outer driven tube (or other similar force fight mechanisms) is known to those ordinarily skilled in the art, and may be applied to the current embodiment in light of the present teachings.

Figure 19:
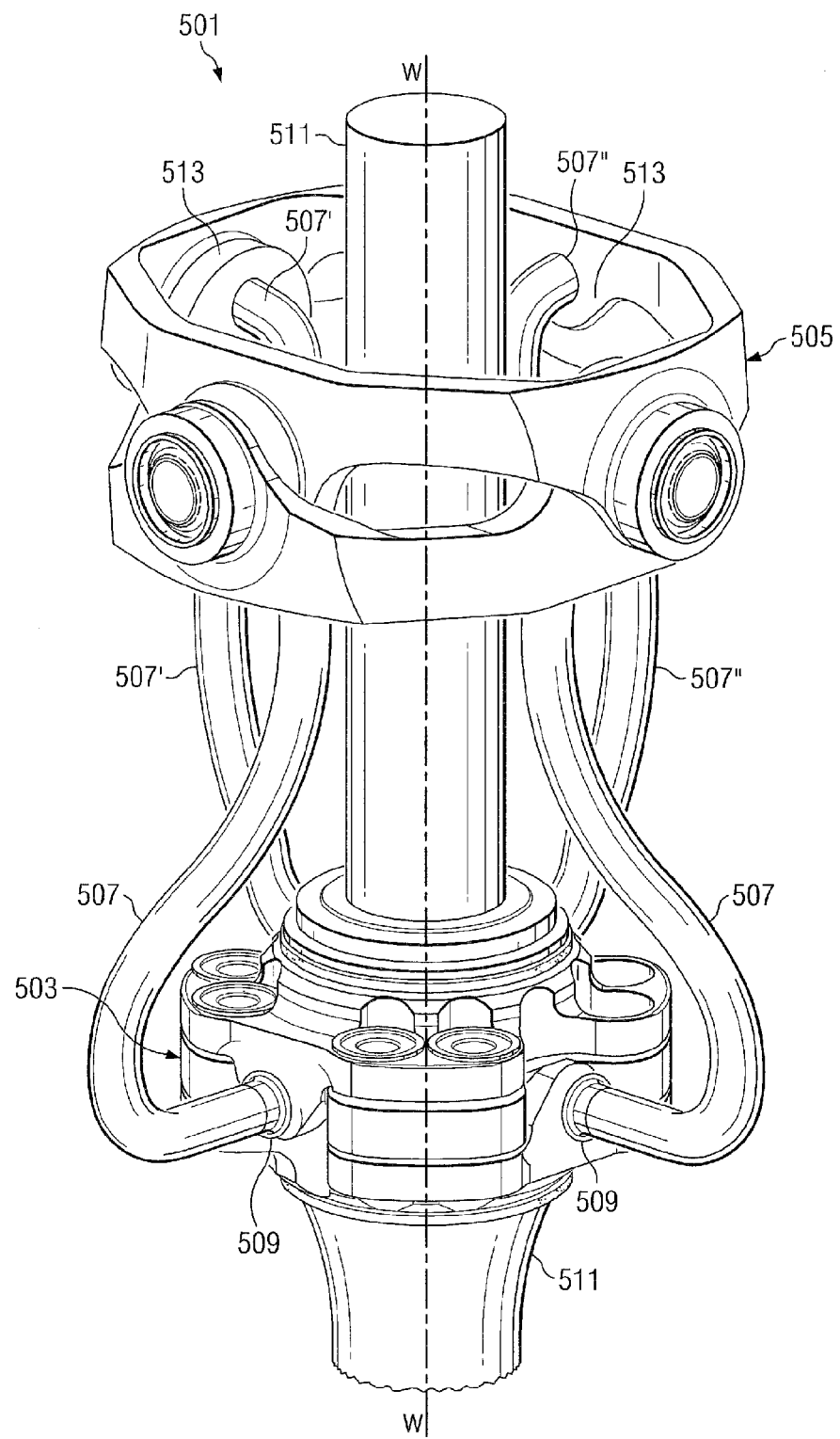
FIG. 19 is an oblique view of an alternative embodiment of a constant-velocity drive system according to the present invention.

Referring now to FIG. 19, a constant-velocity drive system according to the present invention is illustrated. Constant-velocity drive system 501 generally comprises a differential torque-splitting mechanism 503, a double-gimbal device 505, and drive arms 507 for transferring torque from differential torque-splitting mechanism 503 to double-gimbal device 505. Differential torque-splitting mechanism 503 is substantially similar in form and function to differential mechanism 31, but drive pins 509 are adapted for connection to drive arms 507 rather than directly to double-gimbal device 505. Further, double-gimbal device 505 is substantially similar to double-gimbal device 96, however, double-gimbal device 505 does not substantially envelope differential torque-splitting mechanism 503, but rather, double-gimbal device 505 is substantially displaced along an axis W-W (the axis of rotation of a mast 511) away from differential torque-splitting mechanism 503. While drive arms 507 are irregularly-curved shaped members, alternative embodiments of drive arms may be shaped and sized in a myriad of ways while still adequately transferring torque without undesirable deformation of drive arms. Specifically, drive arms 507 are adapted to connect to drive pins 509 of differential torque-splitting mechanism 503 at one end and to drive joints 513 of double-gimbal device 505 at the remaining end. Generally, the path of torque transfer of constant-velocity drive system 501 is substantially similar to that of constant-velocity drive system 27, but with torque additionally being transferred through drive arms 507 so as to allow connection between axially displaced differential torque-splitting mechanism 503 and double-gimbal device 505.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A constant-velocity drive system for a rotary-wing aircraft rotor, the constant-velocity drive system comprising:
    a differential torque-splitting mechanism configured to interface with a mast about a longitudinal mast axis of rotation, the differential torque-splitting mechanism having:
        a drive disk located coaxial with the mast axis of rotation and configured to be integral in rotation with the mast;
        an inner driven member having:
            an inner base portion coaxial with the mast axis and adjacent the drive disk;
            an inner riser portion coaxial with the mast axis and extending away from the inner base portion; and
            inner drive arms extending from the inner riser portion generally radially and spaced a substantial distance along the mast axis away from the inner base portion;
        an outer driven member comprising:
            an outer base portion coaxial with the mast axis and adjacent the drive disk;
            an outer riser portion coaxial with the mast axis and extending from the outer base portion and toward the inner drive arms; and
            outer drive arms extending generally radially from the outer riser portion and spaced along the mast axis away from the outer base portion; and
        triple joint pins each having three joint connections, each joint connection pivotally engaging the drive disk, the inner base portion, or the outer base portion; and
    a gimbal mechanism configured to be driven in rotation by the inner drive arms and the outer drive arms, the gimbal mechanism being configured to connect with a rotor hub for allowing the rotor hub to gimbal with respect to the mast
    wherein the gimbal mechanism is axially displaced from the differential torque-splitting mechanism such that the gimbal mechanism rotates about a first rotational plane relative a second rotational plane of the torque-splitting mechanism.

2. The constant-velocity drive system according to claim 1, at least one of the triple joint pins further comprising:
    opposing end ball joints; and
    a central cylindrical joint having a central cylindrical joint axis;
    wherein the central cylindrical joint pivotally engages the drive disk;
    wherein the central cylindrical joint axis is substantially radial to the mast axis; and
    wherein the at least one pivot pin is configured for translation along the central cylindrical joint axis.

3. The constant-velocity drive system according to claim 1, at least one of the triple joint pins further comprising:
    at least one elongated joint wherein a longitudinal axis of the elongated joint is disposed generally radial to the mast axis.

4. A constant-velocity drive system for a rotary-wing aircraft rotor, the constant-velocity drive system comprising:
    a differential mechanism, the differential mechanism having:
        a drive disk configured to be integral in rotation with a mast;
        an upper member at least partially located above the driven disk;
        a lower member at least partially located below the driven disk;
        at least one link connecting the upper member and the lower member to the drive disk such that the drive disk drives the upper member and the lower member in rotation with the drive disk and that the upper member and the lower member are allowed to rotate differently with respect to the drive disk; and
    a gimbal device for driving a rotor hub and for allowing gimbaling of the rotor hub with respect to the mast, the gimbal device being axially spaced from the differential mechanism along a length of the mast;
    wherein the upper member and the lower member are adapted to drive the gimbal device in rotation; and
    wherein the upper and lower members each comprise a tubular portion, and wherein the tubular portions are concentric.

5. The constant-velocity drive system according to claim 4, wherein the gimbal device comprises a first drive path portion and a second drive path portion, and wherein the upper member is attached to the first drive path portion and the lower member is attached to the second drive path portion.

6. The constant-velocity drive system according to claim 4, the at least one link comprising:
    opposing end joints; and
    a central joint;
    wherein the central joint pivotally engages the drive disk; and wherein each of the end joints pivotally engage one of the upper member and the lower member.

7. The constant-velocity drive system according to claim 6, wherein each of the opposing end joints are ball joints and wherein the central joint is a generally cylindrical joint having a central cylindrical joint axis, the central cylindrical joint axis being substantially radial to the mast, and wherein the at least one link is configured for translation along the central cylindrical joint axis.

8. The constant-velocity drive system according to claim 4, wherein the link includes at least one elongated joint and wherein a longitudinal axis of the elongated joint is disposed generally radial to the mast.

9. A rotary-wing aircraft rotor with constant velocity drive, comprising:
   a rotor mast capable of being driven in rotation about a longitudinal axis of said mast;
   a hub connected to said mast by a constant velocity drive mechanism and by a tilting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast; and
   at least two blades, each linked to said hub by a coupling retaining and hinging the blade in pitch;
   wherein said constant velocity drive mechanism comprises a differential mechanism for splitting static torque and allowing relative movement, in a plane perpendicular to said axis of the mast, between at least two devices for driving the hub, said differential mechanism comprising a set of three disks placed substantially one above another and substantially coaxial about said axis of the mast, a first disk of which, arranged between second and third disks of the set along said axis of the mast, is a driving disk, integral in rotation with said mast and connected to each of the second and third disks, which are driven, by at least one connecting pin having a longitudinal geometrical axis substantially parallel to said axis of the mast, and hinged to each of the disks in the set by one respectively of two opposing end ball joint connections and a central cylindrical joint connection, each joint being substantially centered on the longitudinal geometrical axis of said connecting pin, each of the second and third disks being connected to the hub by at least one of said at least two driving devices which are each also hinged to the hub, so as to drive said hub in rotation about said geometrical axis of rotation of the hub;
   wherein said at least two driving devices are substantially spaced from said differential mechanism along said axis of the mast.

10. A convertible aircraft comprising at least one tilting rotor movable from a first position in which the or each tilting rotor operates as an airplane propeller to a second position in which the or each tilting rotor operates as a helicopter main lifting rotor, the or each tilting rotor comprising:
   a rotor mast capable of being driven in rotation about its longitudinal axis;
   a hub connected to said mast by a constant velocity drive mechanism and by a tilting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast; and
   at least two blades, each linked to said hub by a coupling retaining and hinging the blade in pitch;
   wherein said constant velocity drive mechanism comprises a differential mechanism for splitting static torque and allowing relative movement, in a plane perpendicular to said axis of the mast, between at least two devices for driving the hub, said differential mechanism comprising a set of three disks placed substantially one above another and substantially coaxial about said axis of the mast, a first disk of which, arranged between second and third disks of the set along said axis of the mast, is a driving disk, integral in rotation with said mast and connected to each of the second and third disks, which are driven, by at least one connecting pin having a longitudinal geometrical axis substantially parallel to said axis of the mast, and hinged to each of the disks in the set by one respectively of two opposing end ball joint connections and a central cylindrical joint connection, each joint being substantially centered on the longitudinal geometrical axis of said connecting pin, each of the second and third disks being connected to the hub by at least one of said at least two driving devices which are each also hinged to the hub, so as to drive it in rotation about said geometrical axis of rotation of the hub; and
   wherein said at least two driving devices are substantially spaced from said differential mechanism along said axis of the mast.

11. A rotary-wing aircraft rotor with constant velocity drive, comprising:
   a rotor mast capable of being driven in rotation about a longitudinal axis of said mast;
   a hub connected to said mast by a constant velocity drive mechanism and by a tilting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast; and
   at least two blades, each linked to said hub by a coupling retaining and hinging the blade in pitch;
   wherein said constant velocity drive mechanism comprises a differential mechanism for splitting static torque and allowing relative movement, in a plane perpendicular to said axis of the mast, between at least two devices for driving the hub, said differential mechanism comprising a set of three disks placed substantially one above another and substantially coaxial about said axis of the mast, a first disk of which, arranged between second and third disks of the set along said axis of the mast, is a driving disk, integral in rotation with said mast and connected to each of the second and third disks, which are driven, by at least one connecting pin, each of the second and third disks being connected to the hub by at least one of said at least two driving devices which are each also hinged to the hub, so as to drive said hub in rotation about said geometrical axis of rotation of the hub;
   wherein the connecting pin comprises three joint connections in which no more than two of said joint connections are ball joint connections substantially centered on a longitudinal geometrical axis of said connecting pin; and wherein said at least two driving devices are substantially spaced from said differential mechanism along said axis of the mast.

12. A convertible aircraft comprising at least one tilting rotor movable from a first position in which the or each tilting rotor operates as an airplane propeller to a second position in which the or each tilting rotor operates as a helicopter main lifting rotor, the or each tilting rotor comprising:
- a rotor mast capable of being driven in rotation about its longitudinal axis;
- a hub connected to said mast by a constant velocity drive mechanism and by a tilting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast; and
- at least two blades, each linked to said hub by a coupling retaining and hinging the blade in pitch;
- wherein said constant velocity drive mechanism comprises a differential mechanism for splitting static torque and allowing relative movement, in a plane perpendicular to said axis of the mast, between at least two devices for driving the hub, said differential mechanism comprising a set of three disks placed substantially one above another and substantially coaxial about said axis of the mast, a first disk of which, arranged between second and third disks of the set along said axis of the mast, is a driving disk, integral in rotation with said mast and connected to each of the second and third disks, which are driven, by at least one connecting pin, each of the second and third disks being connected to the hub by at least one of said at least two driving devices which are each also hinged to the hub, so as to drive it in rotation about said geometrical axis of rotation of the hub;
- wherein the connecting pin comprises three joint connections in which no more than two of said joint connections are ball joint connections substantially centered on a longitudinal geometrical axis of said connecting pin; and
- wherein said at least two driving devices are substantially spaced from said differential mechanism along said axis of the mast.

* * * * *